United States Patent
Musso

Patent Number: 5,598,865
Date of Patent: Feb. 4, 1997

[54] QUICK RELEASE TOILET TANK VALVE

[76] Inventor: Vincent Musso, 315 W. Stimpson Ave., Linden, N.J. 07036

[21] Appl. No.: 471,028

[22] Filed: Jun. 6, 1995

[51] Int. Cl.⁶ .......................... F16K 43/00; F16K 31/24; F16K 33/00
[52] U.S. Cl. .................. 137/315; 137/426; 137/430; 137/441; 137/444; 137/613; 251/118; 285/345
[58] Field of Search .................. 137/329.1, 329.2, 137/329.3, 329.4, 386, 426, 430, 441, 442, 444, 15, 613, 315; 251/148, 149.1, 149.8; 285/304, 344, 345

[56] References Cited

U.S. PATENT DOCUMENTS

| | | | |
|---|---|---|---|
| 458,636 | 9/1891 | Meilink et al. | 285/345 |
| 509,879 | 12/1893 | Delaney | 137/329.2 |
| 1,265,670 | 5/1918 | Kaier | 137/329.1 |
| 3,315,970 | 4/1967 | Holloway | 285/345 |
| 3,315,971 | 4/1967 | Sakurada | 285/345 |
| 3,341,228 | 9/1967 | Miller | 285/86 |
| 3,429,333 | 2/1969 | Schoepe et al. | 137/430 |
| 4,082,110 | 4/1978 | Woodbury, Jr. | 137/426 |
| 4,108,481 | 8/1978 | Graham | 285/345 |
| 4,182,364 | 1/1980 | Gilbert et al. | 137/426 |
| 4,286,619 | 9/1981 | Straus | 137/444 |
| 4,332,402 | 6/1982 | Shellhause | 285/86 |
| 4,390,159 | 6/1983 | Duncan | 251/148 |
| 4,562,859 | 1/1986 | Shames et al. | 137/430 |
| 4,722,560 | 2/1988 | Guest | 285/323 |
| 4,765,363 | 8/1988 | Pi-Yu | 137/414 |
| 4,840,196 | 6/1989 | Antunez | 137/426 |
| 4,945,944 | 8/1990 | Chen | 137/403 |
| 5,035,257 | 7/1991 | Antunez | 137/414 |
| 5,125,694 | 6/1992 | Gobbi | 285/307 |
| 5,211,204 | 5/1993 | Mikol | 137/426 |
| 5,255,703 | 10/1993 | Johnson | 137/426 |
| 5,287,882 | 2/1994 | Mikol | 137/426 |

FOREIGN PATENT DOCUMENTS

| | | | |
|---|---|---|---|
| 22773 | of 1906 | United Kingdom | 137/329.2 |
| 592629 | 9/1947 | United Kingdom | 137/329.1 |
| 782904 | 9/1957 | United Kingdom | 137/329.2 |

*Primary Examiner*—George L. Walton
*Attorney, Agent, or Firm*—Lerner, David, Littenberg, Krumholz & Mentlik

[57] ABSTRACT

A quick release connector enables replacement of a toilet tank valve by one having little, if any, knowledge of repair or skills relating to plumbing. The toilet tank valve includes a quick release connector coupling the toilet tank valve to a source of water within the toilet tank. The toilet tank valve may be quickly and easily replaced by manipulation of the quick release connector by the user's fingers without the necessity of mechanical tools or the like.

8 Claims, 2 Drawing Sheets

QUICK RELEASE TOILET TANK VALVE

BACKGROUND OF THE INVENTION

The present invention relates generally to toilet tank valve connection systems, and more specifically, to a quick release connection system for a toilet tank valve having commercial and residential application.

One of the major components of a toilet is the toilet tank valve which controls the level and refilling of water in the toilet tank to enable the flushing operation. These valves are typically inexpensive which results in their frequent breakage or the like. In order to replace a toilet tank valve, it is necessary to disconnect the valve from its secured position within the bottom wall of a toilet tank. This replacement, typically, cannot be accomplished by the home do-it-yourselfer. In particular, special knowledge of plumbing and possession of the requisite tools is required. Unless care is taken, there is the potential of cracking the porcelain toilet tank resulting in greater expenses to be incurred than fixing the original problem. In addition, it is often difficult to shut off the water source at the toilet tank as the control valve is frequently frozen due to long periods of disuse. To this end, plumbers have been frequently employed at high cost, as well as delays in obtaining replacement of the toilet tank valve.

SUMMARY OF THE INVENTION

One object of the present invention is to provide a toilet tank valve that will enable its quick and easy replacement without the services of a plumber or special tools. Preferably, it is desirable to enable the replacement of a broken toilet tank valve by one having little, if any, knowledge of repair or skills related to plumbing.

In accordance with one embodiment of the present invention there is described a toilet tank valve, the valve comprising control means for controlling the filling of a toilet tank with water to a predetermined level, and a quick release connector coupling the control means to a source of the water within the toilet tank, whereby the control means may be replaced with another one of the control means by using the quick release connector.

In accordance with another embodiment of the present invention there is described a quick release toilet tank valve, the valve comprising a housing, a water inlet valve within the housing operatively coupled to a float for filling a toilet tank to a predetermined level, a quick release connector comprising a first component attached to the housing and a second component attached to a source of water within the toilet tank, the first and second components releasably connectable to provide a water tight connection therebetween, whereby the housing is detachable from the source of the water upon disconnection of the first component from the second component for replacement of the housing.

In accordance with another embodiment of the present invention there is described a toilet tank valve for controlling the filling of a toilet tank with water from a source thereof to a predetermined level, wherein the improvement comprises a quick release connector removably coupling the toilet tank valve to the source to permit the replacement of the toilet tank valve by manipulation of the connector.

BRIEF DESCRIPTION OF THE DRAWINGS

The above description, as well as further objects, features and advantages of the present invention will be more fully understood with reference to the following detailed description of a quick release toilet tank valve, when taken in conjunction with the accompanying drawings, wherein.

DETAILED DESCRIPTION OF THE PREFERRED EMBODIMENTS

Figure 1:
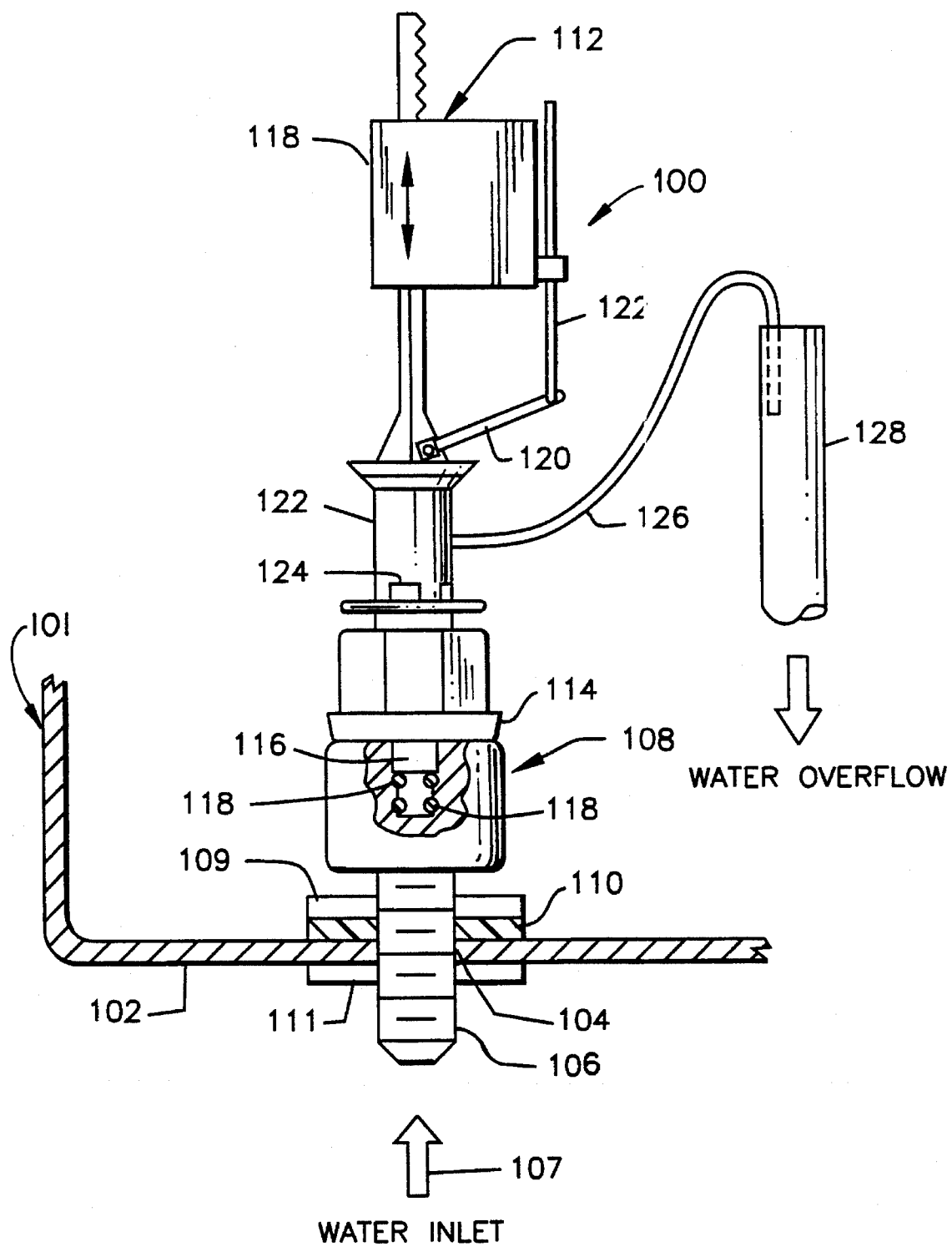
FIG. 1 is a diagrammatic illustration of a quick release toilet tank valve constructed in accordance with one embodiment of the present invention.

Referring now to the drawings, wherein like reference numerals represent like elements, there is illustrated in FIG. 1 a quick release toilet tank valve constructed in accordance with one embodiment of the present invention and generally designated by reference numeral 100. A toilet tank 101 includes a bottom wall 102 having an opening 104. Inserted through the opening 104 is a threaded extension or nipple 106. The threaded extension 106 extends outwardly of the toilet tank 101 to which there is directly connected a water supply 107. Other suitable means may also be incorporated for connecting the water supply 107 to the toilet tank 101. A quick release connector 108, e.g., the female component, is attached to one end of the threaded extension 106 within the toilet tank 101. The threaded extension 106 may also be integrally formed with the quick release connector 108, or provided as a separate nipple. The quick release connector 108 via threaded extension 106 is secured to the bottom wall 102 about a fixed flange 109 in fluid tight arrangement via a gasket 110 and nut 111 combination or other such suitable means.

The quick release connector 108 may be constructed of a variety of types, such as those employing a male and female component. For example, the standard garden hose type quick release connector can be employed in accordance with the present invention. Other quick release connectors are known, for example, U.S. Pat. Nos. 5,125,694, 4,722,560, 3,341,228, and 4,332,402. The quick release connector 108 may be of two different types. The first type is a flow-through type which does not function as a shut-off valve. This will necessitate shutting the main water supply to the toilet as to be described hereinafter. On the other hand, the quick release connector 108 may be of the valve type wherein an internal valve assembly (not shown) normally maintains a fluid closed position until coupled with a male component. Both of these types of quick release connectors are generally known as garden hose connectors and the like.

Installed within the toilet tank 101 is a toilet tank valve 112. The lower end of the valve 112 includes a male fitting 114, forming a component of the quick release connector 108, adapted to releasably engage within the female component of the quick release connector to provide a fluid tight seal thereat. The male fitting 114 includes a projecting stem 116 to which there is a provided one or more O-rings 118. In addition, one or more O-rings may also be provided within the body of the female component of the quick release connector 108. The male fitting 114 is attached to the lower end of the toilet tank valve 112 or water supply riser of a toilet tank valve. It should be understood that the male fitting can also be attached to the threaded extension 106 in the alternative. The toilet tank valve 112 may be of any type construction such as, for example, those disclosed in U.S. Pat. Nos. 4,945,944, 4,765,363, 5,035,257 and the like.

Briefly, the toilet tank valve 112 includes a water height adjustable float 118 which is coupled to a water control lever 120 by means of vertical rod 122. The lever 120 is connected to an internal fluid valve (not shown) within housing 122. As should be apparent, the lowering of the float 118 during the flushing operation will cause the lever 120 to open the fluid valve within the housing 122 to allow water to flow through openings 124 into the interior of the toilet tank 101. In addition, water will flow through tube 126 through overflow tube 128 in the toilet tank 101 as is conventional.

The entire toilet tank valve 112 may be simply and easily disconnected for replacement by means of the quick release connector 108 without the necessity of mechanical tools or the like. The simple manipulation of the quick release connector 108 by one's fingers will enable disconnection of the male fitting 114 along with the toilet tank valve 112. A new toilet tank valve 112, also having a male fitting 114 attached thereto, may be quickly attached to the quick release connector 108 to achieve installation and a fluid tight seal thereat. Depending upon the type of the quick release connector 108 employed, it may be necessary to shut off the main water supply to the toilet tank 101 as noted hereinabove.

Figure 2:
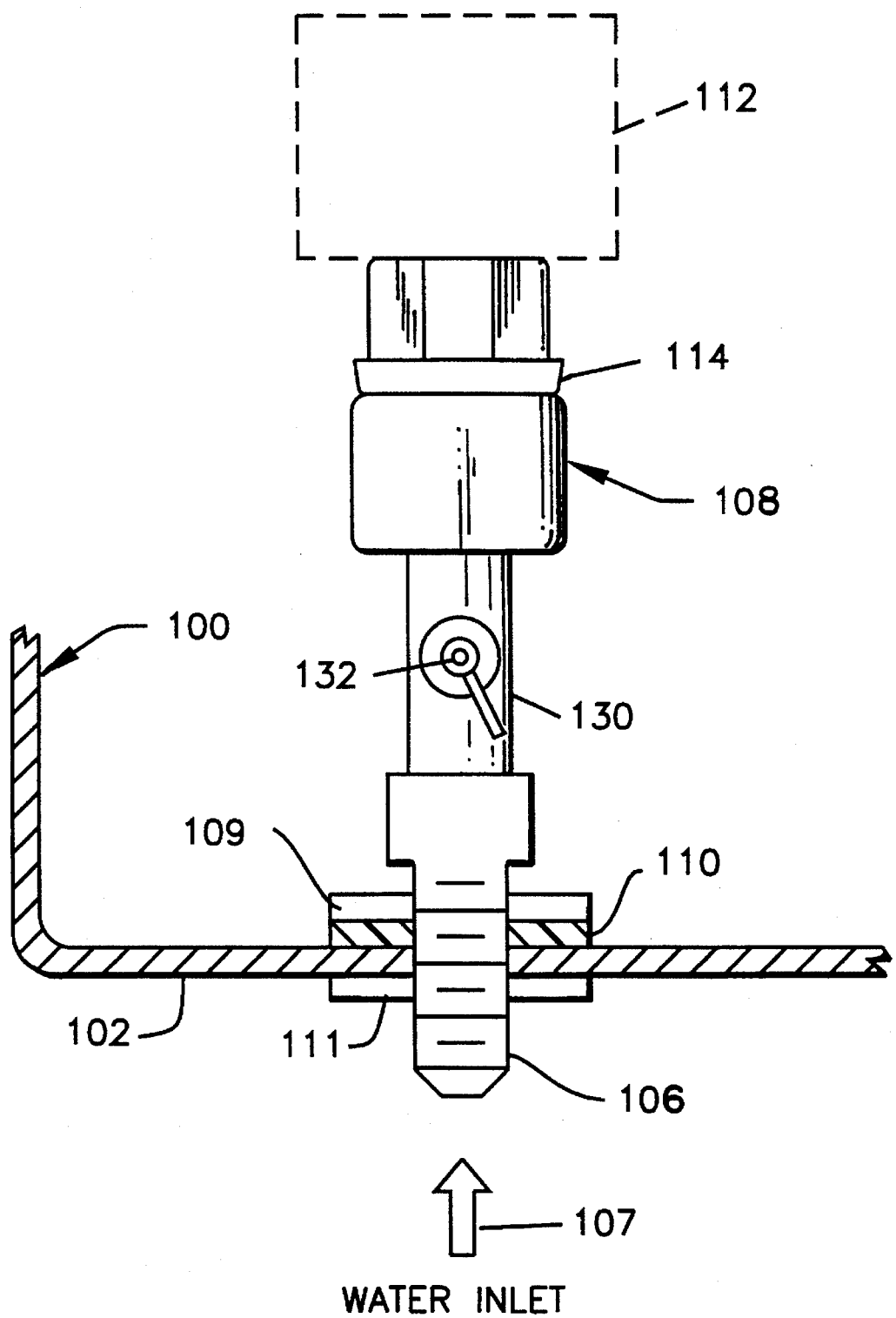
FIG. 2 is a diagrammatic illustration of a quick release toilet tank valve constructed in accordance with another embodiment of the present invention.

Referring now to FIG. 2, there is disclosed another arrangement of a toilet tank valve 112 in accordance with another embodiment of the present invention. A shutoff valve 130 is attached to the threaded extension 106 which is secured within the bottom wall 102 of the toilet tank 101. The shutoff valve 130 includes a valve handle 132 to enable operation of the valve between on and off fluid flow states. The other end of the shutoff valve 130 is connected to the female component of the quick release connector 108, or alternatively to the male fitting 114. In accordance with this embodiment, the shutoff valve 130 may be turned off prior to replacement of the toilet tank valve 112. This avoids the necessity of having to shut off the main water supply to the toilet tank 101 as required by the previous embodiment. The shutoff valve 130 may accordingly be of any type which is operative for shutting off the water flow from the water supply 107.

From the foregoing, it can be appreciated that the present invention relates to a quick release connector and system for installing a toilet tank valve in a toilet tank. Any type of toilet tank valve or quick release connector may be employed without departing from the spirit of my invention.

What is claimed is:

1. A quick release toilet tank valve, said valve comprising a housing, a water inlet valve within said housing operatively coupled to a float for filling a toilet tank to a predetermined level, a quick release connector comprising a first component attached to said housing and a second component within said toilet tank attached to a source of water, one of said components comprising a non-threaded male component and the other of said components comprising a non-threaded female component, said first and second components releasably connectable to each other without threaded engagement of said male and female components to provide a water tight seal connection therebetween upon insertion of said male component within said female component with one of said components sealingly engaging a seal means within said connector, said male component when received within said female component preventing relative movement of said valve within said toilet tank, said connector operative by manipulation solely by one's hand without the use of mechanical tools whereby said toilet tank valve is detachable from said second component and said source of said water upon disconnection of said male component from said female component from within said toilet tank for replacement of said toilet tank valve with another one of said toilet tank valve.

2. The toilet tank valve of claim 1, further including a water shutoff valve arranged between said source of said water and separate from said connector for shutting of said water when disconnecting said male component from said female component.

3. The toilet tank valve of claim 1, wherein said connector is attached to a threaded extension extending into said toilet tank.

4. The toilet tank valve of claim 3, wherein said threaded extension is integrally formed with one of said components of said connector.

5. The toilet tank valve of claim 1, further including adjusting means for adjusting the height of water within said toilet tank, said adjusting means being independent from said quick release connector.

6. A quick release toilet tank valve, said valve comprising a housing, a water inlet valve within said housing operatively coupled to a float for filling a toilet tank to a predetermined level, a quick release connector comprising a first component attached to said housing and a second component within said toilet tank attached to a source of water, one of said components comprising a non-threaded male component and the other of said components comprising a non-threaded female component, said first and second components releasably connectable to each other without threaded engagement of said male and female components to provide a water tight seal connection therebetween upon insertion of said male component within said female component with one of said components sealingly engaging a seal means within said connector, said male component when received within said female component preventing relative movement of said valve within said toilet tank, said connector operative by manipulation solely by one's hand without the use of mechanical tools, one of said components of said connector attached to a threaded extension extending into said toilet tank, said threaded extension being integrally formed within one of said components of said connector whereby the entire toilet tank valve is detachable from said second component and said source of said water upon disconnection of said male component from said female component from within said toilet tank for replacement of said toilet tank valve with another one of said toilet tank valve by connection to said second component.

7. The toilet tank valve of claim 6, further including a water shutoff valve arranged between said source of said water and separate from connector for shutting of said water when disconnecting said male component from said female component.

8. The toilet tank valve of claim 6, further including adjusting means for adjusting the height of water within said toilet tank, said adjusting means being independent from said quick release connector.

* * * * *